United States Patent

Sangster

[15] 3,671,771

[45] June 20, 1972

[54] CHARGE AMPLIFIER FOR A BUCKET BRIGADE CAPACITOR STORE

[72] Inventor: Frederik Leonard Johan Sangster, Emmasingel, Eindhoven, Netherlands

[73] Assignee: U.S. Philips Corporation, New York, N.Y.

[22] Filed: Aug. 20, 1970

[21] Appl. No.: 65,367

[30] Foreign Application Priority Data

Sept. 6, 1969 Netherlands..........................6913618

[52] U.S. Cl. ..........................307/293, 307/221 R, 307/246

[51] Int. Cl. .......................................................H03k 17/26

[58] Field of Search ..........................307/221, 223, 246, 293

[56] References Cited

UNITED STATES PATENTS 3,546,490 12/1970 Sangster ...............................307/293

*Primary Examiner*—Stanley D. Miller, Jr.
*Attorney*—Frank R. Trifari

[57] ABSTRACT

A charge amplifier for a bucket brigade storage circuit uses two transistors, a pair of diodes and two auxiliary capacitors connected in the charging path of one of the bucket brigade capacitors for amplifying the capacitor charge of the bucket brigade capacitor without reducing the permissible driving range of the bucket brigade storage circuit.

7 Claims, 8 Drawing Figures

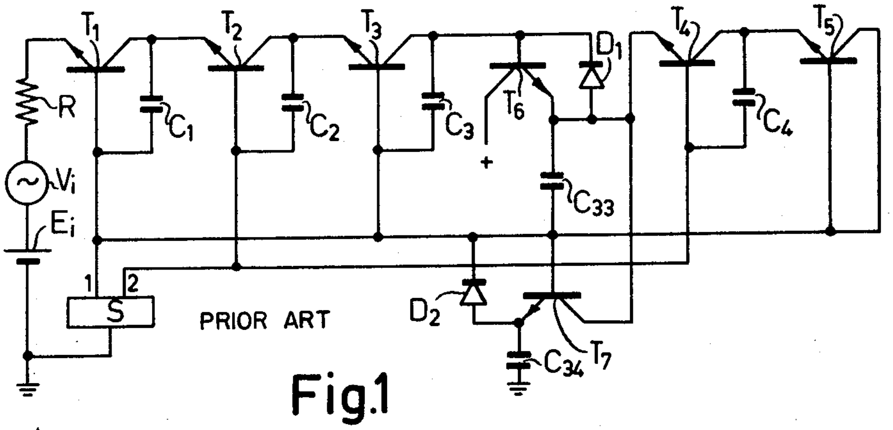
Fig.1
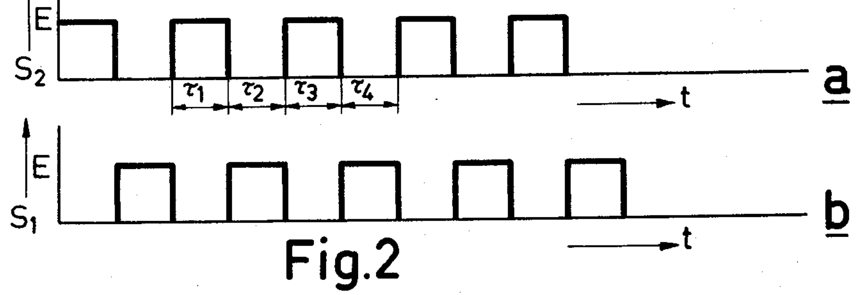
Fig.2
| | $\tau_1$ | $\tau_2$ | $\tau_3$ | $\tau_4$ |
|---|---|---|---|---|
| $C_2$ | $(E-V_j)-\Delta V$ | $(E-V_j)$ | — | — |
| $C_3$ | $(E-2V_j)$ | $(E-2V_j)-\Delta V$ | $(E-2V_j)$ | — |
| $C_{33}$ | $(E-V_j)$ | $(E-3V_j)-\Delta V$ | $(E-V_j)$ | — |
| $C_4$ | — | $(E-V_j)$ | $(E-V_j)(1+\frac{C_{33}}{C}).\Delta V-2V_j\cdot\frac{C_{33}}{C}.$ | $(E-V_j)$ |
Fig.3
INVENTOR.
F. L. J. SANGSTER
BY Frank R. Jifari
AGENT

| | $\tau_1$ | $\tau_2$ | $\tau_3$ | $\tau_4$ |
|---|---|---|---|---|
| $C_2$ | $(E-V_j)-\Delta V$ | $(E-V_j)$ | — | — |
| $C_3$ | $(E-V_j)$ | $(E-V_j)-\Delta V$ | $(E-V_j)$ | — |
| $C_{33}$ | $(E-V_j)$ | $(E-V_j)-\Delta V$ | $(E-V_j)$ | — |
| $C_4$ | — | $(E-V_j)$ | $(E-V_j)-(1+\frac{C_{33}}{C})\Delta V$ | $(E-V_j)$ |

*INVENTOR.*

F. L. J. SANGSTER

*BY*

[signature]

AGENT

INVENTOR.

F. L. J. SANGSTER

BY

AGENT

INVENTOR.
F. L. J. SANGSTER
BY
Frank R. Trifari
AGENT

A CHARGE AMPLIFIER FOR A BUCKET BRIGADE CAPACITOR STORE

The invention relates to a capacitive store which comprises a sequence of storage capacitors and transistors, each storage capacitor being connected in parallel with the collector base path of a transistor and at least one of the storage capacitors being connected in parallel with a charge amplifier which comprises a first and a second auxiliary transistor and a first and a second auxiliary capacitor, the series combination of the base emitter path of the first auxiliary transistor and the first auxiliary capacitor being connected in parallel with the store capacitance. Capacitive stores are frequently used for delaying, for example, video-frequency or audio-frequency signals. The charge present in one of the capacitors of the sequence must be transferred to the next capacitor of the sequence with as little loss as possible.

In a known capacitive store of this type, which is described in Dutch Pat. application 6,711,463 and in U.S. Pat. No. 3,546,490, successive capacitors of the sequence of capacitors are interconnected through the emitter collector paths of transistors. The terminals of the capacitors more remote from the collector circuits are connected to the bases of the respective transistors. The bases of the transistors are interconnected in groups so as to form base junctions to which control signals are applied with mutual phase shifts which ascend in the order of the numbers of the base junctions. As is described in the said specification, only for input signals situated in the interval $-E \leq V_i \leq +E$, where E is the amplitude of the control signal, will there be a linear relationship between the voltage drop $\Delta V$ across the storage capacitor of the first stage of the store and the input signal applied to this first stage. Within the said interval, $\Delta V$ across the said capacitor will pass through the interval $O < \Delta V \leq +E$. When the input signal $V_i$ is equal to zero volt, the voltage drop $\Delta V$ across the capacitor of the first stage will be ½E volt, which voltage hereinafter will be referred to as the zero level. When the input signal $V_i$ is equal to $-E$ volts, the voltage drop $\Delta V$ across the capacitor of the first stage will be equal to zero volts, which voltage hereinafter will be referred to as the peak level.

When the sequence of capacitors in the known capacitive store is large, satisfactory operation of the store is disturbed by the fact that charge is lost during the transfer of charge between two successive capacitors of the sequence, because the collector emitter current gain factor $\alpha$ of the transistors used is slightly smaller than 1. As a result, the zero level will slowly rise towards the peak level as the charge is transferred along the sequence. This effect is enhanced because the transistor charging currents will become smaller after each successive stage in the store and hence in most transistors the collector emitter current gain factor $\alpha$ will also be reduced. After a certain number of stages, in general after several tens of stages, the said zero level has been raised so high that in the upper peaks of the signal the transistor will leave its linear operating range so that the signal is flattened and hence deformed. As a result, in view of the permissible distortion of the electric output signal of the store the permissible amplitude of the input signal will be smaller as the number of store stages will be higher. Measurements have shown that when 50 store stages are used the permissible amplitude of the input signal is about one half of the possible driving range $-E \leq V_i \leq +E$ of the first storage stage of the capacitive store. Measurements have further shown that when 200 stages are used the permissible amplitude of the input signal will be equal to 0 volts.

In the said Dutch patent specification the said charge losses are partly compensated for by shunting at least one of the capacitors of the sequence by the series combination of a first auxiliary capacitor and a diode which during the transfer of charge from one capacitor to the other is conductive and is connected in inverse parallel to the base emitter path of a first auxiliary transistor connected as an emitter follower, the said first auxiliary capacitor being shunted by the base collector path of a second auxiliary transistor the collector of which is connected to the junction of the diode and the first auxiliary capacitor, a diode being connected in inverse parallel to the base emitter path of the second auxiliary transistor the emitter of which is connected to a point of constant potential through a second auxiliary capacitor.

The afore-described solution, which consists in that the said charge losses are partly compensated for by a charge amplifier, is suitable for use in capacitive stores operated by large-amplitude switching signals. It is less suitable, however, for use in capacitive stores operated by small switching signals of, say, 3 volts, as is frequently the case in integrated capacitive stores. This is due to the fact that the permissible amplitude of the input signals is reduced by the said charge amplifier, as will be described in more detail hereinafter.

It is an object of the present invention to provide a charge amplifier which does not suffer from the said disadvantage, and the invention is characterized in that the emitter of the first auxiliary transistor is connected to the first auxiliary capacitor through a diode, the collector of the second auxiliary transistor being connected to the emitter of the first auxiliary transistor, and the junction of the first auxiliary capacitor and the emitter of the first auxiliary transistor being connected to an emitter of the transistor succeeding the storage capacitor.

An embodiment of the invention will now be described, by way of example, with reference to the accompanying diagrammatic drawings, in which:

FIG. 1 shows the known capacitive store,

FIG. 2 shows the wave form of the voltage of the switching voltage source S, FIG. 3 is a table showing the voltages of the capacitors $C_2$, $C_3$, $C_{33}$ and $C_4$.

Figures 4, 5:
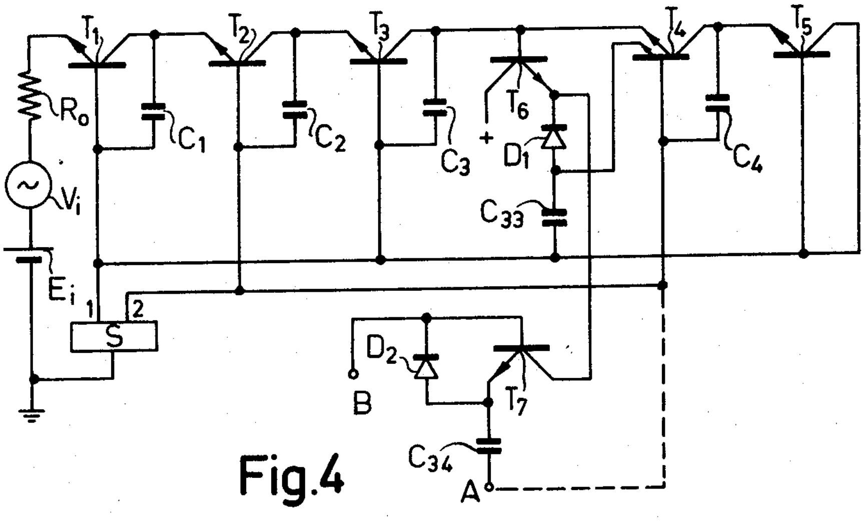
FIG. 4 shows the capacitive store according to the invention.
FIG. 5 is a Table showing the voltages of the capacitors $C_2$, $C_3$, $C_{33}$ and $C_4$ of the store shown in FIG. 4.

Referring now to FIG. 1, the sequence of store capacitors comprises capacitors $C_1$, $C_2$, $C_3$ and $C_4$. These capacitors are connected to one another by the emitter collector paths of transistors $T_1$, $T_2$, $T_3$ and $T_4$ respectively. The bases of the transistors $T_1$, $T_3$ and $T_5$ are connected to an output 1 of a switching voltage source S, and the bases of the transistors $T_2$ and $T_4$ are connected to an output 2 of the switching voltage source S. The emitter of the transistor $T_1$ is connected to a point of constant potential through the series combination of a resistor $R_0$ and a signal voltage source $V_i$. The collector and the basis of the transistor $T_5$ are interconnected. The storage capacitor $C_3$ is shunted by the series connexion of a first auxiliary capacitor $C_{33}$ and a diode $D_1$. The base emitter path of a first auxiliary transistor $T_6$ is connected in inverse parallel to the diode $D_1$. The junction of the diode $D_1$ and the first auxiliary capacitor $C_{33}$ is connected to the emitter of the transistor $T_4$ and also to the collector of a second auxiliary transistor $T_7$. The base of this second auxiliary transistor is connected to the output 1 of the switching voltage source S. A diode $D_2$ is connected in inverse parallel to the base emitter path of the second auxiliary transistor $T_7$. The emitter of the second auxiliary transistor $T_7$ is connected to earth through a second auxiliary capacitor $C_{34}$. The operation of the circuit arrangement will now be described with reference to FIG. 2.

The voltage set up at the outputs 1 and 2 of the switching voltage source S are shown in FIGS. 2*b* and 2*a* respectively.

FIGS. 2*a* and 2*b* show ideal square-wave voltages. In practice, however, the slope of the edges of the squares is made less steep in order to avoid saturation phenomena of the transistors of the capacitive store which may give rise to deformation of the signal to be delayed. It is assumed that in the time interval $\tau_1$ the voltage drop across the store capacitor $C_2$ is $\Delta$ V volts. During the time interval $\tau_1$ the transistor $T_4$ is conducting. The capacitor $C_3$ will be charged until the voltage across it has become equal to $(E - 2V_j)$ volts, where $V_j$ is equal to the base emitter threshold voltage of the transistor $T_4$ and also to the junction voltage of the diodes $D_1$ and $D_2$. During the time interval $\tau_1$ the first auxiliary capacitor $C_{33}$ is charged until the voltage across it has become equal to $(E - V_j)$ volts, see FIG. 3. During the same time interval the second auxiliary capacitor $C_{34}$ is discharged through the diode $D_2$ until the voltage across this capacitor has become equal to $V_j$ volts.

During the time interval $\tau_2$ the transistor $T_3$ is conducting. The capacitor $C_3$ will discharge until the voltage across it has become equal to $(E - 2V_j) - \Delta V$ volts, see FIG. 3. During the time interval $\tau_2$ the transistor $T_6$ also will be conducting. The first auxiliary capacitor $C_{33}$ will be discharged until the voltage across it has become equal to $(E - 3V_j) - \Delta V$ volts, see FIG. 3. During the time interval $\tau_2$ the transistor $T_7$ also will be conductive, so that the voltage across the second auxiliary capacitor will become $(E - V_j)$ volts. During the time interval $\tau_2$ the voltage across the capacitor $C_4$ is brought to $(E - V_j)$ volts.

During the time interval $\tau_3$ the transistor $T_4$ is conducting. As a result, the capacitor $C_3$ will be charged until the voltage across it has risen to $(E - 2V_j)$ volts, which requires a charge of $C_3$. $\Delta$ V coulombs, which charge is taken from the capacitor $C_4$. At the same time, the first auxiliary capacitor $C_{33}$ is charged until the voltage across it has risen to $(E - V_j)$ volts. This requires a charge of $(C_{33} . \alpha V + 2V_j)$ coulombs, and this charge will also be taken from the capacitor $C_4$. Thus, during the time interval $\tau_3$ altogether a charge of $(2 V_j + \Delta V.(C_3 + C_{33}))$ coulombs is taken from the capacitor $C_4$. Consequently, the voltage across the capacitor $C_4$ will fall to $[E - V_j) - (1 + C_{33}/C). \Delta V - 2 V_j. C_{33}/C]$ volts, see FIG. 3. This means that the information $\Delta$ V initially present in the capacitor $C_3$ has been transferred to the capacitor $C_4$ amplified by a factor $(1 + C_{33}/C)$. The driving range of the capacitor $C_4$ is equal to $[(E - V_j) - 2 V_j . C_{33}/C]$ volts. This means that this range has been reduced by $2 V_j . C_{33}/C$ volts by the provision of the charge amplifier. Assuming $E = 3$ volts, $V_j = 0.5$ volt and $C_{33}/C = 2$, this means that the possible driving me range of 2.5 volts has been reduced to 0.5 volt.

FIG. 4 shows a solution of this problem. The charge amplifier comprises transistors $T_6$ and $T_7$, diodes $D_1$ and $D_2$ and capacitors $C_{33}$ and $C_{34}$. The transistor $T_6$ is the first auxiliary transistor and the transistor $T_7$ is the second auxiliary transistor. The capacitor $C_{33}$ is the first auxiliary capacitor and the transistor $C_{34}$ is the second auxiliary capacitor. The series combination comprising the base emitter path of the first auxiliary transistor $T_6$ connected as an emitter follower, the diode $D_1$ and the first auxiliary capacitor $C_{33}$ is connected in parallel with the store capacitor. The junction of the diode $D_1$ and the first auxiliary capacitor $C_{33}$ is connected to an emitter of a multi-emitter transistor $T_4$. The emitter of the first auxiliary transistor $T_6$ is connected to the collector of the second auxiliary transistor $T_7$. The diode $D_2$ is connected in inverse parallel to the base emitter path of the second auxiliary transistor. The second auxiliary capacitor $C_{34}$ is connected to the emitter of the transistor $T_7$. Normally a terminal A is connected to a point of constant potential, for example the substrate of a semiconductor body in which the capacitor $C_{34}$ has been integrated. Under certain circumstances, however, there may be applied to the terminal A of the capacitor $C_{34}$ a voltage which is the sum of a negative bias voltage and the switching voltage appearing at the output 2 of the switching voltage source S. This is shown by a broken line. In this case, the negative bias voltage is required to maintain the integrated capacitor $C_{34}$ cut off.

A point B of the charge amplifier usually is connected to the output 1 of the switching voltage source S. However, if high switching speeds and minimum distortion are required, it is desirable to apply another voltage to the point B, i.e. the sum of a negative bias voltage and the voltage appearing at the output 1 of the switching voltage source. The voltages set up at the outputs 1 and 2 of the switching voltage source S are shown in FIGS. 2*a* and 2*b*, respectively. It is assumed that during the time interval $\tau_1$ the voltage drop across the capacitor $C_2$, which contains the information, is equal to $\Delta$ V volts. During this time interval the transistor $T_4$ is conducting. The capacitor $C_3$ then will be charged until the voltage across it has become equal to $(E - V_j)$ volts, see FIG. 5. During the time interval $\tau_1$ the first auxiliary capacitor $C_{33}$ is charged until the voltage across it has become equal to $(E - V_j)$ volts, see FIG. 5. During the same time interval the second auxiliary capacitor $C_{34}$ is discharged through the diode $D_2$.

During the time interval $\tau_2$ the transistor $T_3$ is conducting. The capacitor $C_3$ will be discharged until the voltage across it has become equal to $[(E - V_j) - \Delta V]$ volts, see FIG. 5. During the time interval $\tau_2$ the transistor $T_6$ also will be conducting. The first auxiliary capacitor $C_{33}$ will be discharged until the voltage across it has become equal to $[(E - V_j) - \Delta V]$ volts, see FIG. 5. During the time interval $\tau_2$ the transistor $T_7$ also will be conducting, so that the voltage across the second auxiliary capacitor will become $(E - V_j)$ volts, see FIG. 5. During the time interval $\tau_2$ the voltage across the capacitor $C_4$ is brought to $(E - V_j)$ volts, see FIG. 5.

During the time interval $\tau_3$ the transistor $T_4$ is conducting. Hence, the capacitor $C_3$ will be charged until the voltage across it has risen to $(E - V_j)$ volts, which requires a charge of $C_3$. $\Delta$ V coulombs, which charge is taken from the capacitor $C_4$. At the same time, the first auxiliary capacitor $C_{33}$ is charged until the voltage across it has risen to $(E - V_j)$ volts. This requires a charge of $C_{33}$ . $\Delta$ V coulombs, which will also be taken from the capacitor $C_4$. During the time interval $\tau_3$ a charge of $(C_3 + C_{33})$ $\Delta$ V coulombs is taken from the capacitor $C_4$. As a result, the voltage across the capacitor $C_4$ will fall to $[(E - V_j) - (1 + C_{33}/C) \Delta V]$ volts, see FIG. 5. This means that the information $\Delta$ V initially present in the capacitor $C_3$ has been transferred to the capacitor $C_4$ amplified by a factor $(E + C_{33}/C)$. The driving range of the capacitor $C_4$ now is equal to $(E - V_j)$ volts. Thus, the driving range of the capacitor $C_4$ has been increased by $2V_j$. $C_{33}/C$ volts by the charge amplifier used.

Figure 7:
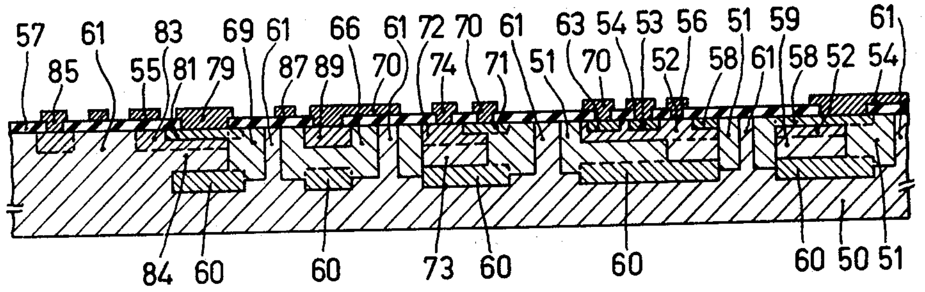
FIG. 7 is a sectional view taken on the line VII — VII in FIG. 6.
Figure 8:
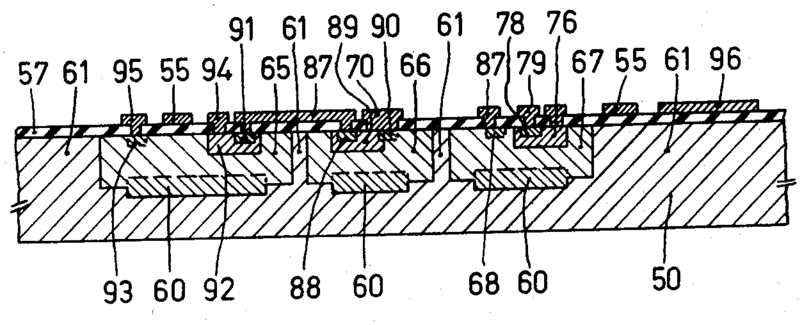
FIG. 8 is a sectional view taken on the line VIII — VIII of FIG. 6.

An integrated embodiment of a capacitive store according to the invention will now be described with reference to FIGS. 6, 7 and 8.

Figure 6:
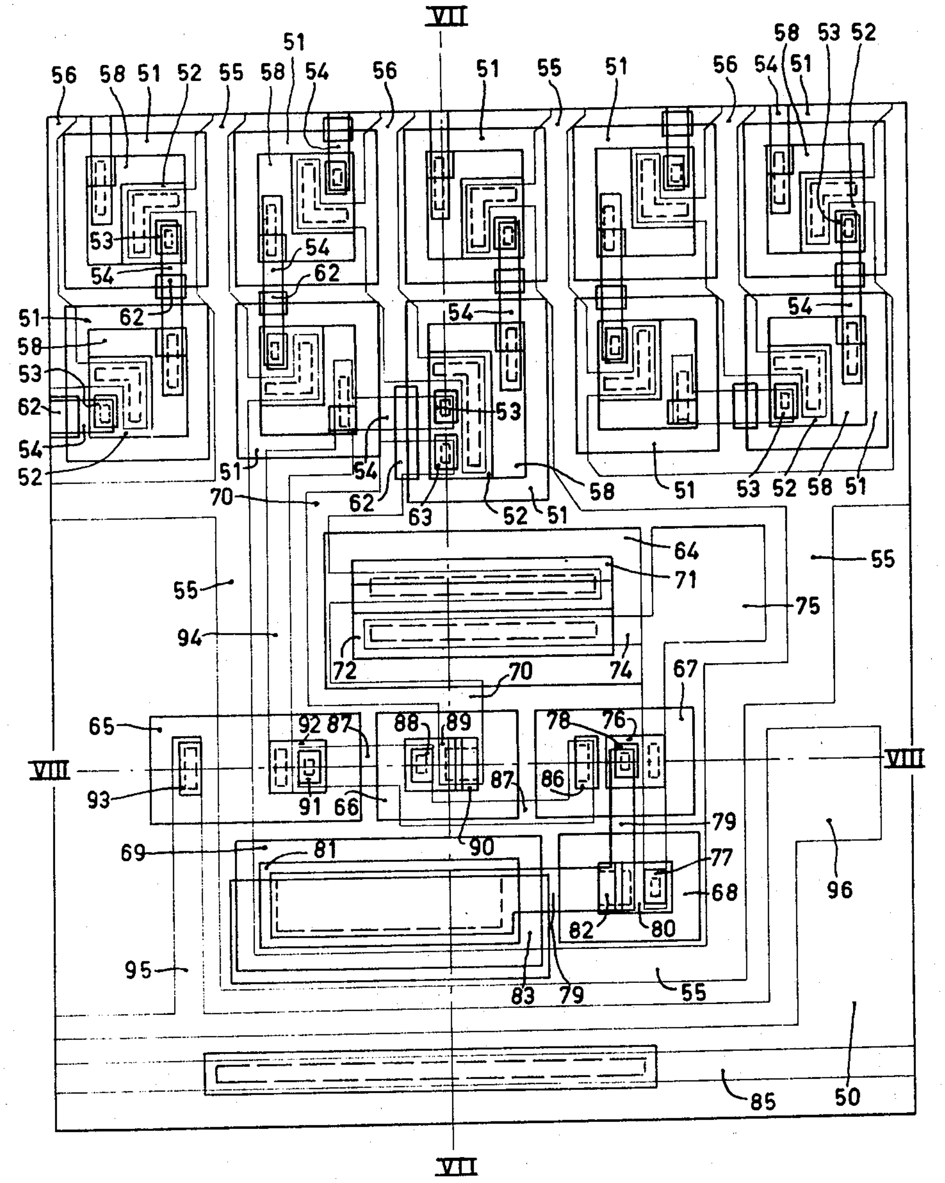
FIG. 6 is a top plan view of part of an integrated store according to the invention.

FIG. 6 shows a part of a top plan view of an integrated store according to the invention, in particular the part containing the charge amplifier. A semiconductor body 50 includes isolated islands 51 which incorporate transistors for charge shifting. The base collector capacitances of the transistors are used as storage capacitors. The said capacitors each have a base region 52 and an emitter region 53. These transistors form a sequence, the collector 51 of a transistor of the sequence being connected through a conductive track 54 to the emitter 53 of the next transistor of the sequence. The bases 52 of successive transistors of the sequence are alternately connected to a track 55 or a track 56 by means of which the charge shifting is controllable. The conductive tracks 54, 55 and 56, which extend on an insulating layer 57 provided on the semiconductor surface, are connected to the relevant semiconductor regions through openings in the layer 57 which are shown by broken lines.

Since the base collector capacitances of the transistors are used as storage capacitors it is desirable for their values to be comparatively high. In the present embodiment this has been achieved by making the areas of the base regions 52 comparatively large and by partly covering these regions 52 with a region 58 produced simultaneously with the emitter regions 53 (see also FIG. 7). The regions 58 overlap part of the edges of the base regions 52 so that the regions 58 are directly connected to the collector regions 57 of the same conductivity type. Further, the base regions 52 have second portions 59 which lie outside the active parts of the transistors and extend to low-resistance parts 60 of the collector regions 51. The low-resistance parts 60 are in the form of buried layers, and the second portions 59 of the base regions 52 can be produced simultaneously with the isolating regions 61.

In order to reduce the capacitance between the emitter and the collector or any one transistor, which capacitance may be inconvenient owing to electric cross-talk between successive storage capacitors, diffused regions 62 have been produced beneath the track 54 simultaneously with the production of the base regions 52. Consequently the regions 62 are of the same conductivity type as are the isolating regions 61 and they are directly connected thereto by overlapping.

It should be noted that such an integrated capacitive store as described hereinbefore has also been described in our co-pending application Ser. No. 816,913, filed Apr. 17, 1969.

According to the circuit diagram of FIG. 4 a charge amplifier is included between two transistors of the sequence, namely the transistors $T_3$ and $T_4$, and for this purpose the latter transistor $T_4$ has been provided with an additional emitter. This additional emitter is designated by 63 in FIGS. 6 and 7. The additional emitter 63 is connected by a conductive track 70 to a region 71 which has been produced simultaneously with the emitter regions of the transistors and which forms part of an auxiliary capacitor located in a semiconductor island 64. The other circuit elements of the charge amplifier are disposed in isolated semiconductor islands 65 to 69. The said auxiliary capacitor comprises, in addition to the region 71, a region of which a part 72 has been produced together with the base regions of the transistors, whilst a part 73 has been produced together with the isolating regions 61 and is overlapped by the region 71. The part 73 further adjoins a buried layer 60. The part 72 is connected by a conductive track 74 to a connecting pad 75 which is situated on the isolating layer 57 and is connected also to the base region 76 of a transistor situated in the island 67 and to a region 77 of a diode situated in the island 68, which latter region has been produced simultaneously with the emitter regions. The emitter region 78 of the latter transistor (see also FIG. 8) is connected by a conductive track 79 to a region 80 of the said diode, which region has been produced simultaneously with the base regions of the transistors, and to a region 91 of a further auxiliary capacitor situated in the island 69. The region 80 of the diode is short-circuited to the island 68 in known manner by means of a region 82 produced simultaneously with the emitter regions and of the track 79. The said further auxiliary capacitor also includes a region which comprises a part 83 produced simultaneously with the base regions and a part 84 produced simultaneously with the isolating regions and which partly overlaps the edge of the island 69, so that this region is connected to the substrate part of the semiconductor body 50. The part 84 of the diode extends to a buried layer 60.

The substrate part of the semiconductor body 50 can have a suitable potential applied to it through a conductive track 85.

The collector region of the transistor situated in the island 67 is contacted in a conventional manner by means of a contact region 86 produced simultaneously with the emitter regions and is connected by a conductive track 87 to the region 88 of a diode situated in the island 66 and to the emitter region of a transistor situated in the island 65. The latter diode is of a design identical to that of the diode situated in the island 68, regions 88, 89 and 90 corresponding to regions 77, 80 and 82, respectively. Further, regions 91, 92 and 93 of the transistor situated in the island 65 correspond to regions 78, 76 and 86, respectively, of the transistor situated in the island 67.

The region 89 of the diode is connected by the track 70 to the additional emitter and to the region 71 of the auxiliary capacitor situated in the island 64. The base region 92 is connected by a conductive track 84 to the collector region 51 of that transistor of the sequence which precedes the multi-emitter transistor. A suitable supply voltage can be applied to the collector region 93 through a conductive track 95 and a connecting pad 96.

To the connecting pad 75 there may be applied a voltage which is derived from the voltage applied to the conductive track 55 for controlling the charge transfer by the addition of a direct-current component. The addition of this direct-current component ensures that the pn junction between the regions 71 and 72, which junction is used as a capacitor, will always be biassed in the reverse direction, and also enables the value of this capacitor to be slightly controlled, permitting adjustment of the value of the charge amplification. With respect to this adjustment it may be desirable for this capacitor to be externally provided instead of being integrated, because this would allow the value of the charge amplification to be selected in a wider range.

The integrated store described may entirely be manufactured in a manner known in semiconductor technology with the use of conventional materials, for example, by starting from a p-type silicon body coated with an n-type epitaxial layer. Using the conventional photo etching and masking techniques the various regions required having the usual doping concentrations are obtainable by diffusion of known impurities, such as boron and phosphorus. The insulating layer 57 may consist of silicon dioxide and/or silicon nitride, whilst the conductive tracks may be made of aluminum or another suitable conductive material.

The integrated store may be mounted in a conventional case.

Obviously, the invention is not restricted to the example described, but for one skilled in the art many modifications are possible without departing from the scope of the invention. For example, both bipolar transistors and field-effect transistors may be used. The circuit described in FIG. 4 may be used to advantage to produce a filter for electric analogous signals. Further, conventional input and output circuits may be used in combination with the circuit described. When the store is in the form of an integrated circuit other isolating techniques may be used. For example, the semiconductor body may consist of a substrate of insulating material on or in which discrete semiconductor regions are provided.

What is claimed is:

1. A capacitor store comprising a plurality of transistors having serially interconnected collector-emitter paths wherein the bases of adjacent transistors are connected to switching voltages operating in phase opposition, comprising a separate storage capacitor connected in parallel with the collector base path of each transistor in the capacitor store, a first auxiliary transistor, a first auxiliary capacitor, a second auxiliary transistor, a diode, means for connecting the first auxiliary capacitor to the base of the first auxiliary transistor through the diode, means for serially connecting the base emitter path of the first auxiliary transistor and the first auxiliary capacitor across a selected storage capacitor of the capacitor store, means for connecting the emitter of the first auxiliary transistor to the collector of the second auxiliary transistor, and means for connecting the side of the first auxiliary capacitor remote from the selected storage capacitor to an emitter of the transistor which succeeds the selected storage capacitor.

2. A capacitor store as claimed in claim 1, further comprising a second auxiliary capacitor, and means for connecting the emitter of the second auxiliary transistor to a point of constant potential through the second auxiliary capacitor.

3. A capacitor store as claimed in claim 1, further comprising a second diode, and means for connecting the emitter of the second auxiliary transistor to the switching voltage source for the capacitor store through the second diode.

4. A capacitor store as claimed in claim 1, further comprising means for connecting the base of the second auxiliary transistor to a side of the first auxiliary capacitor remote from the emitter of the first auxiliary transistor.

5. A capacitor store as claimed in claim 2, wherein the base of the second auxiliary transistor is connected to a terminal of the first auxiliary capacitor remote from the emitter of the first auxiliary transistor.

6. A capacitor store as claimed in claim 3, wherein the base of the second auxiliary transistor is connected to a terminal of the first auxiliary capacitor remote from the emitter of the second auxiliary transistor.

7. A capacitor store as claimed in claim 1, wherein substantially all of the components of the capacitor store are integrated in a semiconductor body.

* * * * *